US010633028B2

United States Patent
Winter (10) Patent No.: US 10,633,028 B2
(45) Date of Patent: Apr. 28, 2020

(54) AUTONOMOUS ALL-TERRAIN VEHICLE FRAME STRUCTURE

(71) Applicant: Honda Motor Co., Ltd., Tokyo (JP)

(72) Inventor: Justin M. Winter, Mt. Victory, OH (US)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 15/820,875

(22) Filed: Nov. 22, 2017

(65) Prior Publication Data

US 2019/0152527 A1 May 23, 2019

(51) Int. Cl.
*B62D 21/02* (2006.01)
*B62D 21/08* (2006.01)
(Continued)

(52) U.S. Cl.
CPC ............. *B62D 21/02* (2013.01); *B60K 1/04* (2013.01); *B60K 5/00* (2013.01); *B62D 21/08* (2013.01); *B62D 21/09* (2013.01); *B62D 21/11* (2013.01); *B62D 25/088* (2013.01); *B62D 33/02* (2013.01); *G05D 1/021* (2013.01); *G05D 2201/02* (2013.01)

(58) Field of Classification Search
CPC ........ B62D 21/02; B62D 21/08; B62D 21/09; B62D 21/11; G05D 2201/0207; G05D 2201/0216; G05D 2201/0218
See application file for complete search history.

(56) References Cited

U.S. PATENT DOCUMENTS 3,554,311 A * 1/1971 Thompson ............... B60K 1/04
180/220
4,698,775 A * 10/1987 Koch ....................... B25J 5/007
414/265
(Continued)

FOREIGN PATENT DOCUMENTS

CN 206327495 U 4/2017
KR 20100137960 12/2010

OTHER PUBLICATIONS

"Cargo Unmanned Ground Vehicles" http://www.w54.biz/showthread.php?391-Unmanned-Ground-Vehicles/page7 (Accessed Aug. 4, 2017).
(Continued)

*Primary Examiner* — Barry Gooden, Jr.
(74) *Attorney, Agent, or Firm* — Rankin, Hill & Clark LLP (57) ABSTRACT

A frame structure for an all-terrain vehicle includes left and right upper main frame members and left and right lower main frame members, each upper and lower main frame member extended in a longitudinal direction of the frame structure. The left and right upper main frame members are horizontally disposed and have upper mounting surfaces. The left and right lower main frame members have forward and rearward portions mounted to the left and right upper main frame members and central portions extended in a lateral direction of the frame structure outward of the left and right upper main frame members. Left and right first sub-frame members are mounted to the forward and rearward portions of the left and right lower main frame members, and are laterally aligned with the left and right upper main frame members in a top view of the frame structure.

15 Claims, 9 Drawing Sheets

(51) Int. Cl.
  *B62D 21/09*   (2006.01)
  *B62D 25/08*   (2006.01)
  *G05D 1/02*    (2020.01)
  *B62D 33/02*   (2006.01)
  *B62D 21/11*   (2006.01)
  *B60K 1/04*    (2019.01)
  *B60K 5/00*    (2006.01)

(56) References Cited

U.S. PATENT DOCUMENTS

| | | | | |
|---|---|---|---|---|
| 4,810,028 A * | 3/1989 | Henricks | | B62D 21/08 |
| | | | | 293/42 |
| 5,201,566 A * | 4/1993 | Mori | | B62D 21/11 |
| | | | | 296/192 |
| 5,584,510 A * | 12/1996 | Thuliez | | B62D 21/02 |
| | | | | 280/784 |
| 5,975,624 A * | 11/1999 | Rasidescu | | B62D 21/183 |
| | | | | 180/311 |
| 6,193,274 B1 * | 2/2001 | Brown | | B62D 21/11 |
| | | | | 280/784 |
| 6,588,831 B1 * | 7/2003 | Ochoa | | B62D 21/09 |
| | | | | 296/203.03 |
| 7,513,516 B2 | 4/2009 | Ryan | | |
| 7,819,220 B2 * | 10/2010 | Sunsdahl | | B62D 21/183 |
| | | | | 180/312 |
| 7,883,100 B1 * | 2/2011 | Wu | | B60G 3/20 |
| | | | | 280/124.136 |
| 8,862,296 B2 * | 10/2014 | Kurakawa | | B60K 1/04 |
| | | | | 701/22 |
| 8,955,632 B2 * | 2/2015 | Schurna | | B62D 23/005 |
| | | | | 180/210 |
| 8,973,691 B2 * | 3/2015 | Morgan | | B60K 1/00 |
| | | | | 180/68.5 |
| 9,004,535 B2 * | 4/2015 | Wu | | B62D 23/005 |
| | | | | 180/311 |
| 9,097,538 B1 * | 8/2015 | Bush | | G01C 21/26 |
| 9,868,343 B2 * | 1/2018 | Uranaka | | B62D 21/11 |
| 9,878,614 B1 * | 1/2018 | Dunne, Jr. | | B60K 17/22 |
| 10,173,512 B1 * | 1/2019 | Huang | | B60L 50/66 |
| 10,336,370 B1 * | 7/2019 | Lowery, Jr. | | B60K 1/04 |
| 2002/0020572 A1 * | 2/2002 | Wooldridge | | B60K 5/12 |
| | | | | 180/68.4 |
| 2003/0168887 A1 * | 9/2003 | Stoffels | | B62D 21/11 |
| | | | | 296/193.09 |
| 2009/0014993 A1 * | 1/2009 | Tope | | B60R 3/002 |
| | | | | 280/781 |
| 2010/0078926 A1 * | 4/2010 | Miura | | B62D 21/02 |
| | | | | 280/785 |
| 2010/0272549 A1 * | 10/2010 | Petty | | B60P 3/122 |
| | | | | 414/500 |
| 2011/0106352 A1 * | 5/2011 | Scheuerman | | G05D 1/0242 |
| | | | | 701/22 |
| 2012/0097466 A1 * | 4/2012 | Usami | | B60K 1/04 |
| | | | | 180/68.5 |
| 2013/0153314 A1 * | 6/2013 | Niedzwiecki | | B62D 21/08 |
| | | | | 180/65.245 |
| 2015/0051779 A1 * | 2/2015 | Camacho-Cook | | A01C 15/00 |
| | | | | 701/23 |
| 2015/0060159 A1 * | 3/2015 | Sawai | | B62M 27/02 |
| | | | | 180/311 |
| 2015/0122561 A1 * | 5/2015 | Kashiwai | | B60K 1/00 |
| | | | | 180/65.6 |
| 2015/0137558 A1 * | 5/2015 | Ayuzawa | | B62D 25/2036 |
| | | | | 296/193.07 |
| 2015/0142250 A1 * | 5/2015 | Cavender-Bares | | A01C 7/00 |
| | | | | 701/23 |
| 2015/0314810 A1 * | 11/2015 | Watanabe | | B60K 5/12 |
| | | | | 296/203.02 |
| 2016/0039463 A1 * | 2/2016 | Ormiston | | B60P 1/28 |
| | | | | 298/17 R |
| 2016/0368535 A1 * | 12/2016 | Kim | | B62D 21/08 |
| 2017/0008386 A1 * | 1/2017 | Uranaka | | B60K 11/04 |
| 2017/0015185 A1 * | 1/2017 | Uranaka | | B62D 21/02 |
| 2017/0015352 A1 * | 1/2017 | Uranaka | | B60G 3/20 |
| 2017/0057546 A1 * | 3/2017 | Dressel | | B62D 21/11 |
| 2017/0166255 A1 * | 6/2017 | Peterson | | B60R 21/13 |
| 2017/0197658 A1 * | 7/2017 | Dowle | | B62D 21/02 |
| 2017/0225715 A1 * | 8/2017 | Kobayashi | | B60L 53/16 |
| 2018/0065465 A1 * | 3/2018 | Ward | | B60K 5/10 |
| 2018/0141593 A1 * | 5/2018 | Kim | | B62D 21/11 |
| 2018/0154940 A1 * | 6/2018 | Fritz | | B62D 21/02 |
| 2018/0186410 A1 * | 7/2018 | Tsumiyama | | B62D 25/16 |
| 2018/0203458 A1 * | 7/2018 | Zhang | | A01G 9/14 |
| 2018/0215415 A1 * | 8/2018 | Isom | | B60N 2/24 |
| 2019/0185056 A1 * | 6/2019 | Lowery, Jr. | | B62D 21/02 |
| 2019/0185057 A1 * | 6/2019 | Lowery, Jr. | | B60K 1/04 |

OTHER PUBLICATIONS

"DIYGoKart" https://www.pinterest.ie/pin/384987468120550320 (Accessed Aug. 4, 2017).
"Mega UGV" http://www.megaev.com/mega-ugv/ (Accessed Aug. 4, 2017).
"Multifunction Utility" https://www.militaryfactory.com/imageviewer/ar/gallery-ar.asp?armor_id=314 (Accessed Aug. 4, 2017).
"Mutt UGV" http://hamshenci.livejournal.com/28932.html (Accessed Aug. 4, 2017).
"The Unmanned Ground Vehicle" https://www.pinterest.se/pin/737534876446712384/ (Accessed Aug. 4, 2017).

* cited by examiner

AUTONOMOUS ALL-TERRAIN VEHICLE FRAME STRUCTURE

BACKGROUND

There are increasing applications for autonomous vehicles, especially autonomous all-terrain vehicles that are adapted and configured to traverse unprepared terrain. The present disclosure relates to a frame structure for an autonomous all-terrain vehicle.

BRIEF DESCRIPTION

According to one aspect, a frame structure for an autonomous all-terrain vehicle comprises left and right laterally spaced upper main frame members and left and right laterally spaced lower main frame members, each upper and lower main frame member extended in a longitudinal direction of the frame structure. Each of the left and right upper main frame members is horizontally disposed and has an upper mounting surface. Each of the left and right lower main frame members has a forward portion and a rearward portion each inclined upwards and mounted to the respective left and right upper main frame members and a central portion extended in a lateral direction of the frame structure outward of the respective left and right upper main frame members. Left and right first sub-frame members are disposed bridgingly between and mounted to the forward and rearward portions of the respective left and right lower main frame members. The left and right first sub-frame members are laterally aligned with the respective left and right upper main frame members in a top view of the frame structure.

According to another aspect, an autonomous all-terrain vehicle comprises a frame structure including left and right laterally spaced upper main frame members extended in a longitudinal direction of the frame structure. Each of the left and right upper main frame members is horizontally disposed. Upper surfaces of each left and right upper main frame member together define an uppermost mounting plane of the frame structure. Operational components for driving and maneuvering the vehicle are mounted to the frame structure. Each operational component is disposed entirely beneath the uppermost mounting plane of the frame structure.

According to another aspect, an autonomous all-terrain vehicle comprises a frame structure. The frame structure includes left and right laterally spaced upper main frame members and left and right laterally spaced lower main frame members, each upper and lower main frame member extended in a longitudinal direction of the frame structure. Each of the left and right upper main frame members is horizontally disposed and has an upper mounting surface. Each of the left and right lower main frame members has a forward portion and a rearward portion each mounted to the respective left and right upper main frame members. Left and right forward platform mounting brackets are mounted to the forward inclined portions of the respective left and right lower main frame members. Left and right rear platform mounting brackets are mounted to the rearward inclined portions of the respective left and right lower main frame members. Mounting surfaces of the respective forward and rear platform mounting brackets are parallel to the upper mounting surfaces of the respective left and right upper main frame members.

DETAILED DESCRIPTION

Figure 2:
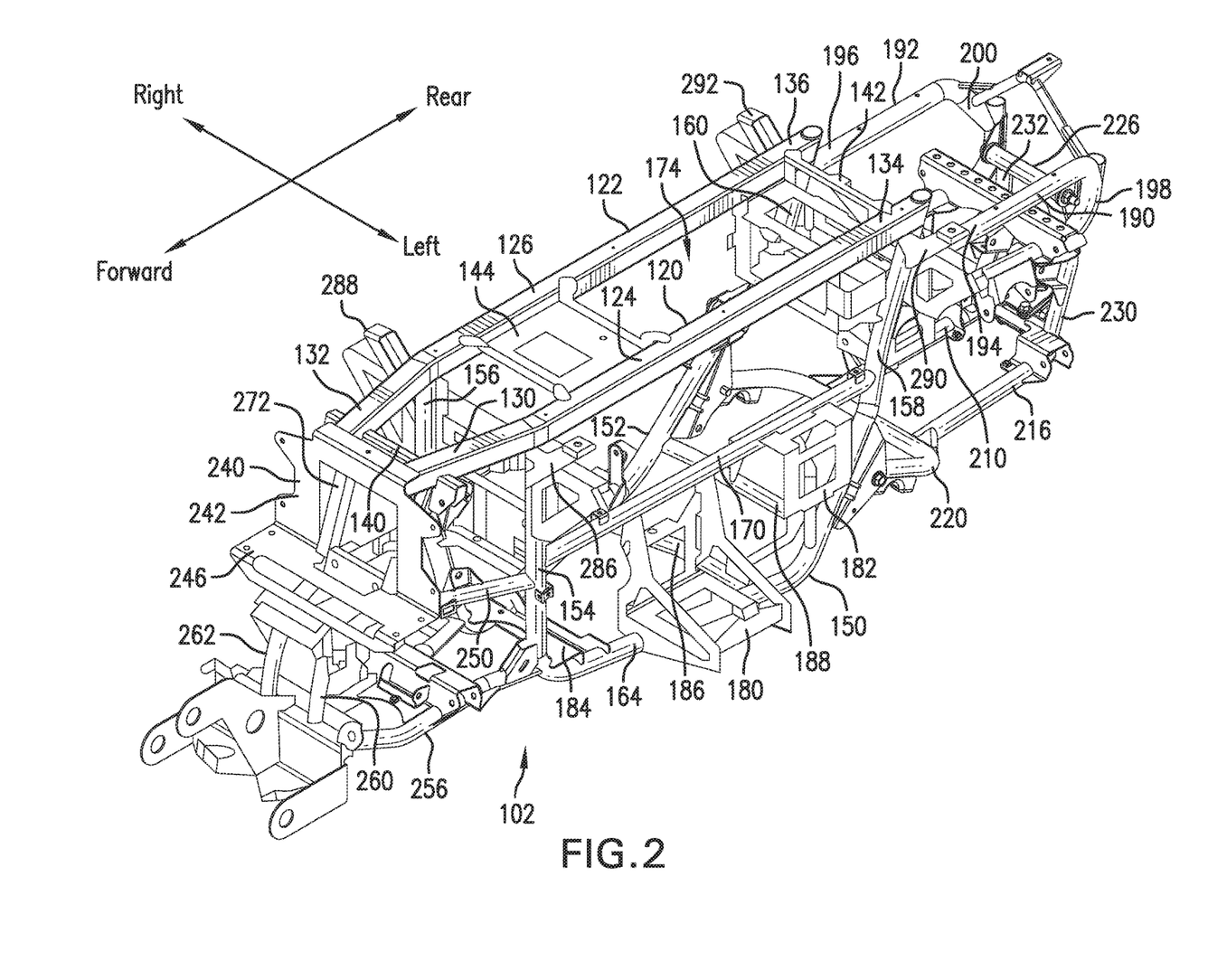
FIGS. 2 and 3 are perspective views of an exemplary frame structure for the autonomous all-terrain vehicle of FIG. 1.
Figure 3:
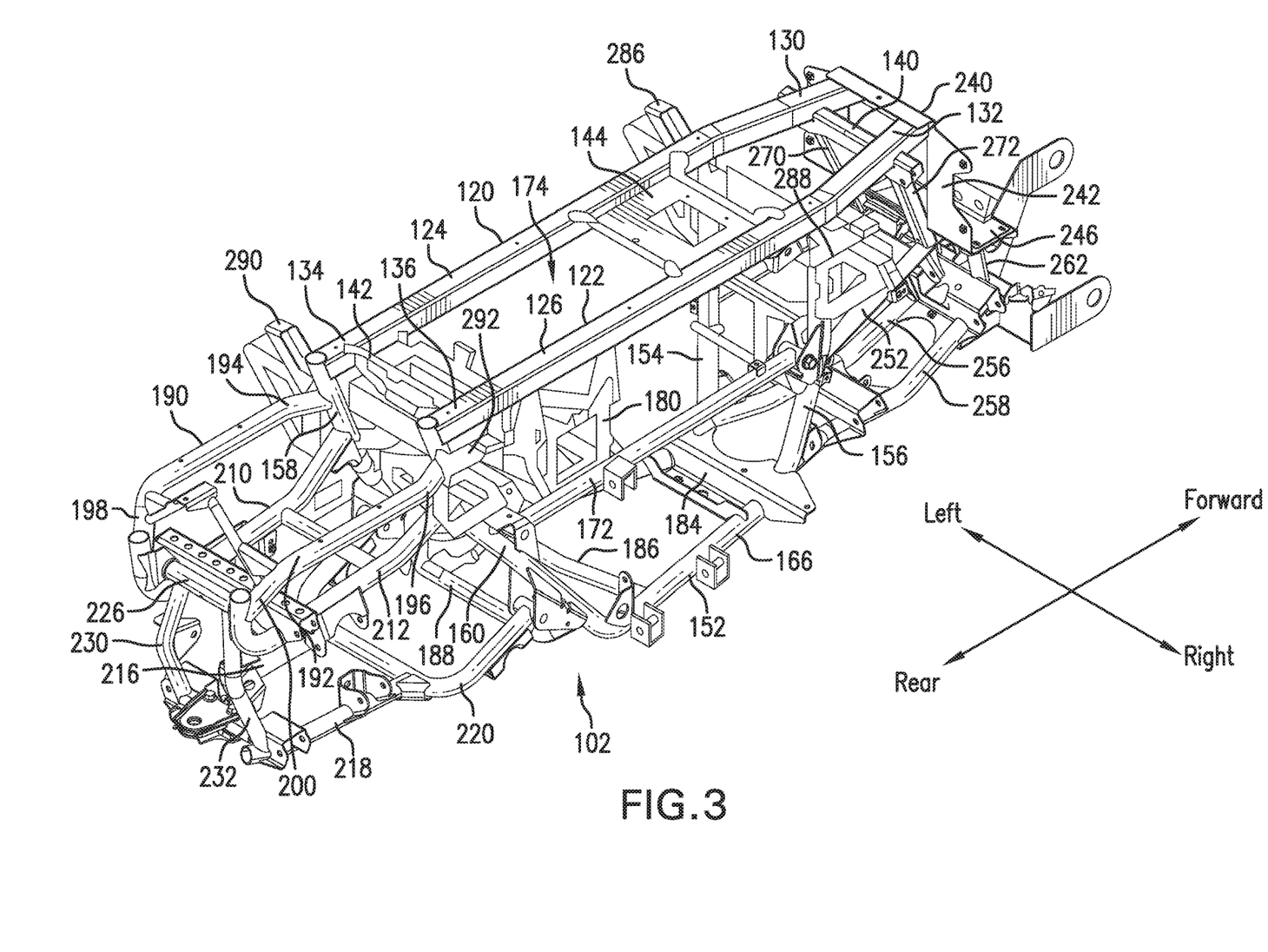
Figure 4:
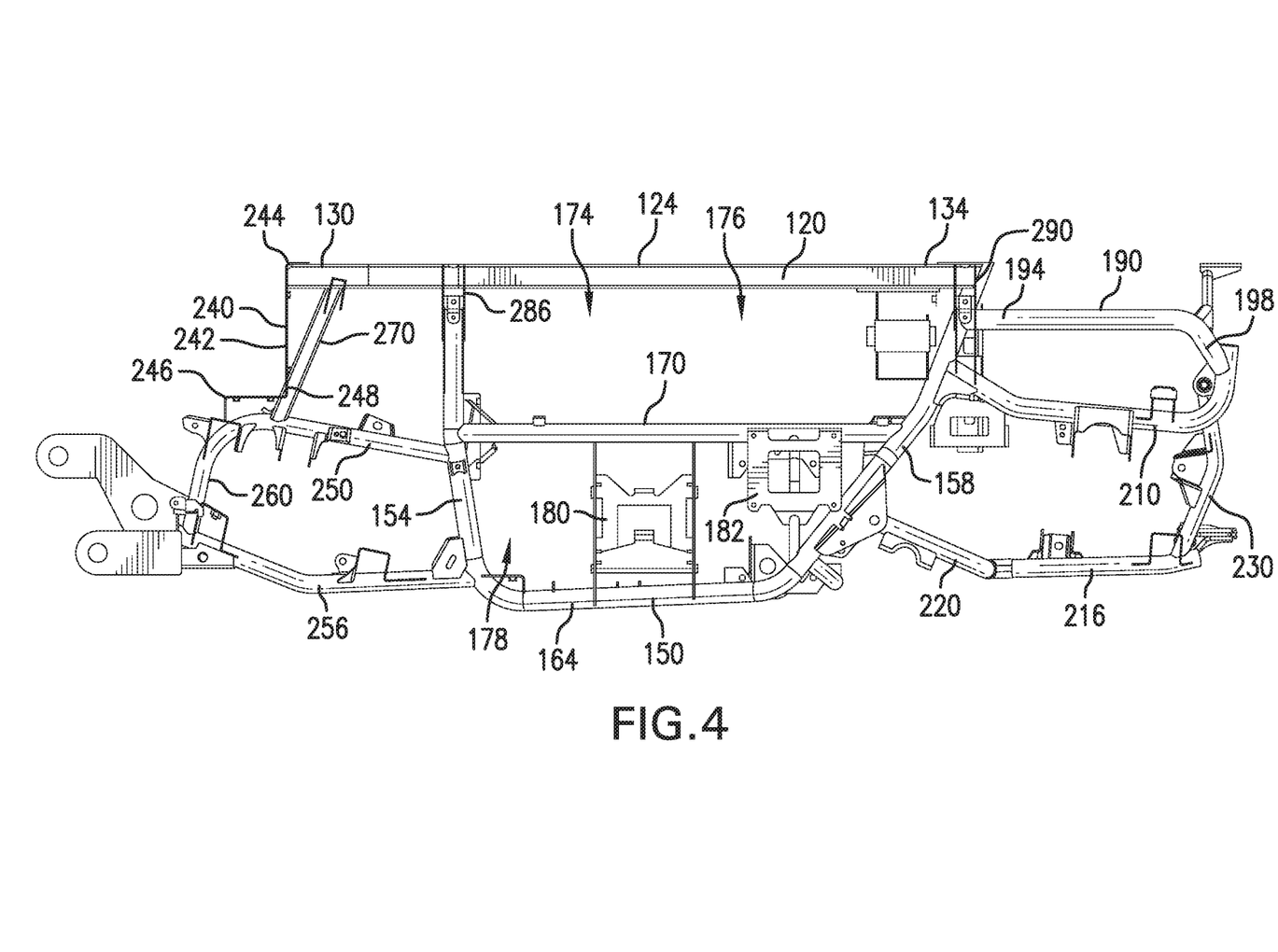
FIG. 4 is a side view of the frame structure of FIG. 2.
Figure 5:
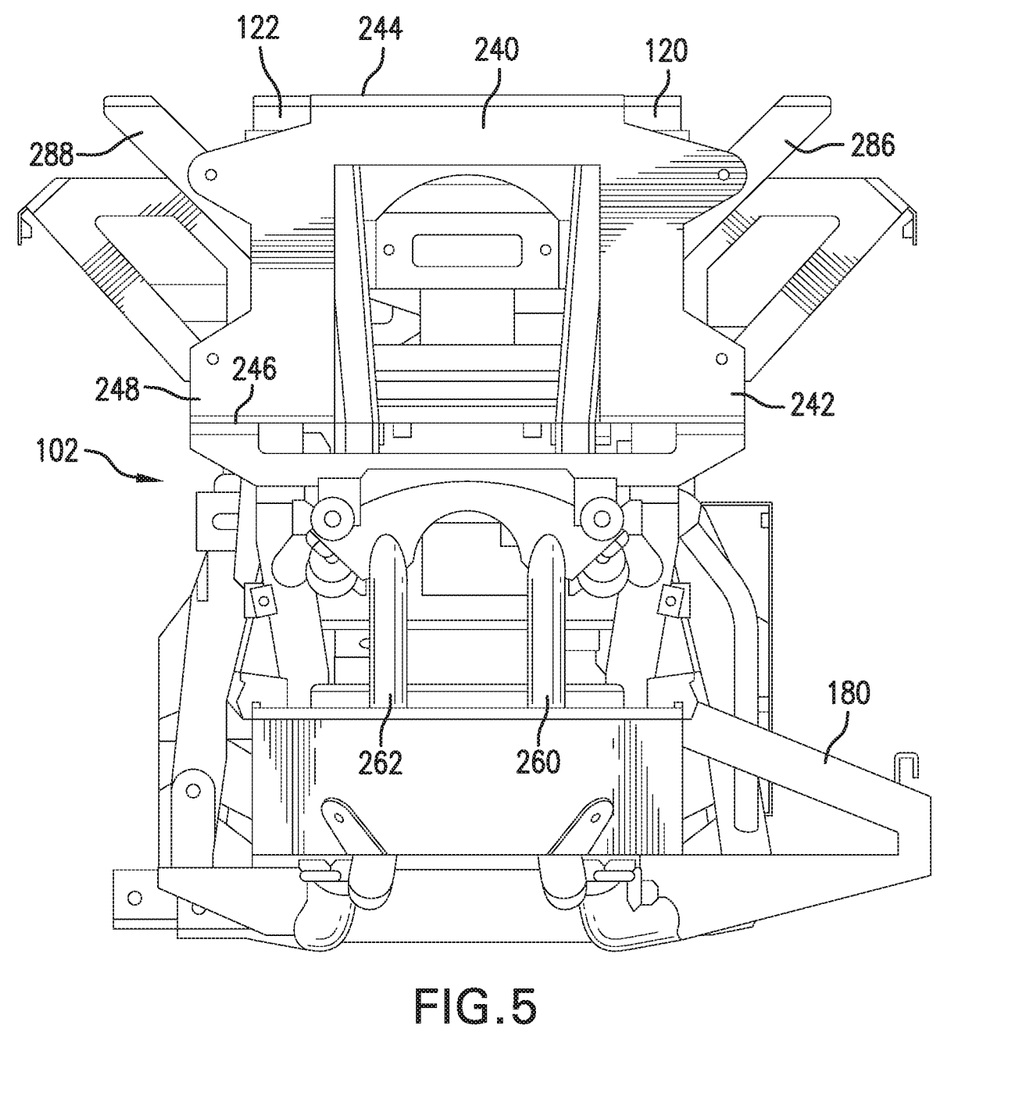
FIG. 5 is a front view of the frame structure of FIG. 2.

It should, of course, be understood that the description and drawings herein are merely illustrative and that various modifications and changes can be made in the structures disclosed without departing from the present disclosure. As used herein, longitudinal directions refer to forward and rearward directions of vehicle travel, transverse/lateral directions are across a width of the vehicle, i.e., left and right directions, and vertical directions relate to elevation, i.e., upward and downward directions. Further, for purposes of description herein, the terms forward, rearward, rear, right, left, vertical, horizontal, and derivatives thereof shall relate to the frame structure of the vehicle as oriented in FIGS. 2 and 3.

Figure 1:
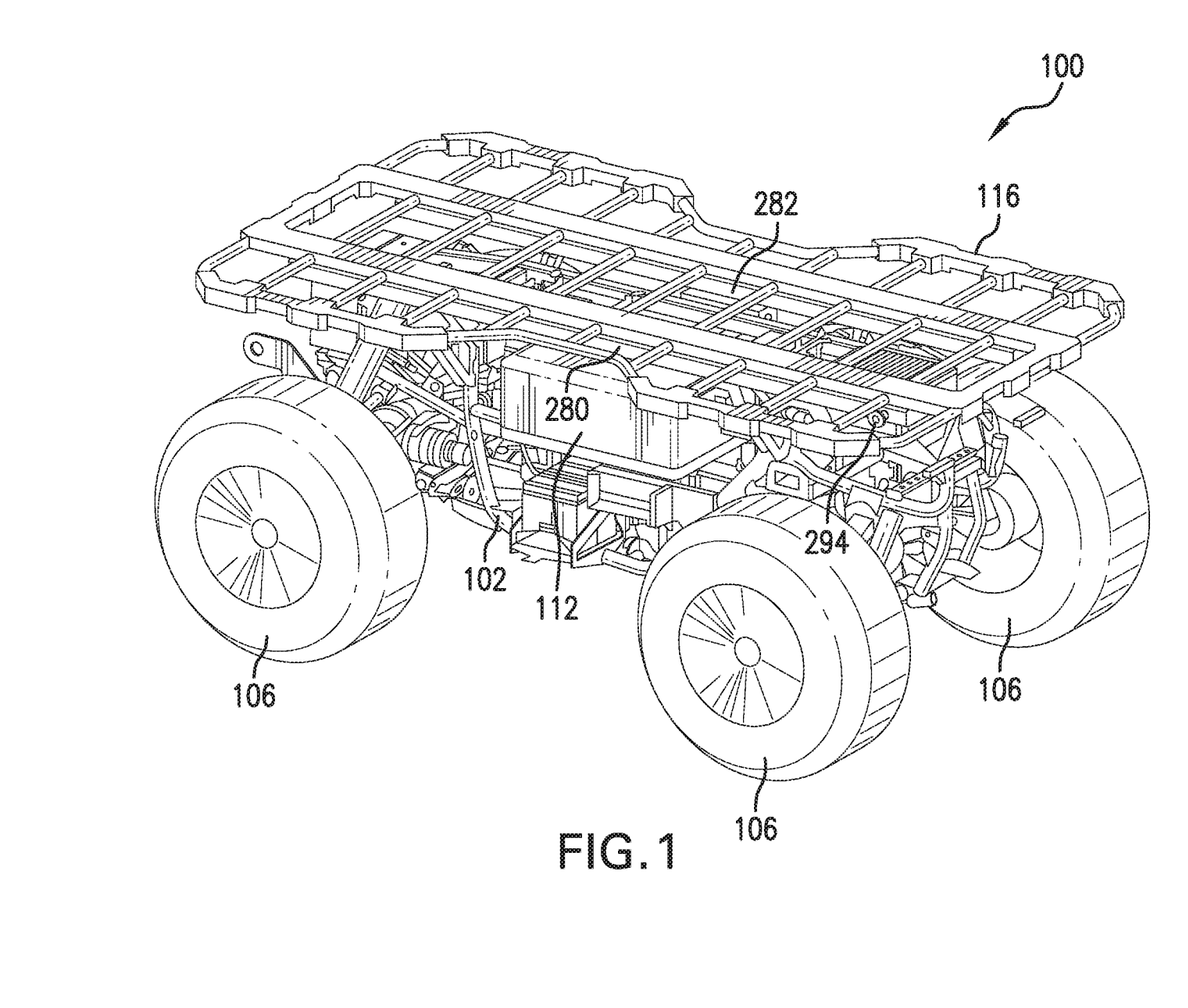
FIG. 1 is a perspective view of an autonomous all-terrain vehicle according to the present disclosure.

Referring now to the drawings, wherein like numerals refer to like parts throughout the several views, FIG. 1 illustrates an autonomous all-terrain vehicle 100 according to the present disclosure. The vehicle 100 is designed to travel off-road on a variety of terrains, including roadless rugged terrain, for recreational, utility and/or other purposes. The vehicle 100 comprises a frame structure 102 supporting a plurality of operational components for driving and maneuvering the vehicle 100, including a powertrain, a steering system, a suspension, and a braking system. The powertrain is configured for generating motive power and transmitting motive power to ground-engaging traction components, such as the depicted wheels 106, to propel the vehicle 100 on the ground. The powertrain includes a prime mover (e.g., an internal combustion engine, an electric motor, etc.) for generating motive power, and is in a driving relationship with the wheels 106 to propel the vehicle 100. In the depicted aspect, the prime mover is an electric motor 110, and, it should be appreciated, that power output of the electric motor 110 (FIGS. 7 and 8) can be controlled by a controller using parameters based on the particular specifications of the electric motor 110. With use of the electric motor, it should further be appreciated that the controller may manage a rechargeable battery unit of the vehicle 100, which can include a single battery or a plurality of batteries (e.g., a battery pack 112) and an associated battery generator/charger. This may allow the controller to monitor the state of the rechargeable battery unit as well as to affect the power output of the electric motor 110 based on current battery levels. The battery pack 112 can include a conventional lead acid battery, a nickel-cadmium battery, a nickel metal hydride battery, a lithium ion battery, or a combination of conventional batteries. As is well known, the powertrain includes a transmission having elements that are operable to transmit mechanical power from the electric motor 110 to the wheels 106. To this end, the transmission can include a gearbox, clutch, differential, and drive shafts. The transmission could include other operational elements known to one skilled in the arts. The drive shafts can include one or more axles that can be coupled to the one or more wheels 106. According to one aspect, the frame structure 102 supports a horizontally disposed cargo carrying platform 116; although, additional user components can be supported by the frame structure 102. By way of example, instead of (or in addition to) the cargo carrying platform 116, an accessory rack (for, e.g., power tools) can be mounted to the frame structure.

With reference to FIGS. 2-5, the frame structure 102 includes left and right laterally spaced upper main frame members 120, 122 extended in a longitudinal direction of the frame structure. Each of the left and right upper main frame members 120, 122 is horizontally disposed and has an upper mounting surface 124, 126. According to one aspect, each of the left and right upper main frame members 120, 122 is rectangular shaped in cross-section taken along the lateral direction of the frame structure 102. Each of the left and right upper main frame members 120 includes a first or forward end portion 130, 132 and a second or rear end portion 134, 136 (forward and rear directions of the frame structure 102 identified in the figures). A forward support member 140 interconnects the forward end portions 130, 132 and a rear support member 142 interconnects the rear end portions 134, 136. Further, a component support plate or pan 144 located rearward of the forward support member 140 can be disposed bridgingly between the left and right upper main frame members 120, 122.

The frame structure 102 further includes left and right laterally spaced lower main frame members 150, 152 extended in the longitudinal direction of the frame structure. Each of the left and right lower main frame members 150, 152 has a first or forward portion 154, 156 and a rearward portion 158, 160. The forward portions 154, 156, which can be inclined forward and upwards, are mounted to the left and right upper main frame members 120, 122. The rearward portions 158, 160, which can be inclined rearward and upwards, are also mounted to the left and right upper main frame members 120, 122. In the depicted embodiment, the forward end portions 130, 132 of the left and right upper main frame members 120, 122 are extended forward of the forward portions 154, 156 of the left and right lower main frame members 150, 152, and the rear end portions 134, 136 of the left and right upper main frame members 120, 122 terminate at the rearward portions 158, 160 of the left and right lower main frame members 150, 152. The left and right lower main frame members 150, 152 further include central portions 164, 166. According to one aspect, the central portions 164, 166 are extended in a lateral direction of the frame structure 102 outward of the respective left and right upper main frame members 120, 122 in a top view of the frame structure 102. Therefore, a lateral dimension of an upper part of the frame structure 102 is narrowed compared to a lower part of the frame structure.

Further, left and right first sub-frame members 170, 172 are disposed bridgingly between and mounted to the forward portions 154, 156 and the rearward portions 158, 160 of the left and right lower main frame members 150, 152. In the illustrated embodiment, the left and right first sub-frame members 170, 172 are laterally aligned with the respective left and right upper main frame members 120, 122 in a top view of the frame structure 102, which further provides for a narrowed lateral dimension of the frame structure 102. It should be appreciated that the left and right first sub-frame members 170, 172 separate a component space 174 defined by the frame structure 102 into an upper component space 176 for mounting of an associated first operational component (for example, the battery pack 112) and a lower component space 178 for mounting of an associated second operational component (for example, the electric motor 110).

Further depicted are mounting brackets 180, 182 for operational components of the vehicle 100 connected between the central portion 164 of the left lower main frame member 150 and the left first sub-frame member 170. A forward lower cross brace or support 184 for mounting of an operational component and lower cross members 186, 188 are disposed bridgingly between and mounted to the left and right lower main frame members 150, 152.

With continued reference to FIGS. 2-5, left and right laterally spaced upper rear frame members 190, 192 are extended in the longitudinal direction rearward of the left and right main frame members 120, 122. Each of the left and right upper rear frame members 190, 192 is horizontally disposed, extended parallel to the respective left and right main frame members 120, 122, and is offset in a downward vertical direction from the respective left and right upper main frame members 120, 122. As depicted, first or forward end portions 194, 196 of the left and right upper rear frame members 190, 192 are mounted to the rearward portions 158, 160 of the left and right lower main frame members 150, 152. A second or rear end portion 198, 200 of each left and right upper rear frame member 190, 192 can be curved downwardly. Left and right upper rear suspension sub-frame members 210, 212 are disposed bridgingly between and mounted to the rearward portions 158, 160 of the respective left and right lower main frame members 150, 152 and the rear end portions 198, 200 of the respective left and right upper rear frame members 190, 192. Left and right lower rear suspension sub-frame members 216, 218 can be mounted to a U-shaped frame member 220 connected to the rearward portions 158, 160 of the respective left and right lower main frame members 150, 152. A rearmost cross member 226 is disposed bridgingly between and mounted to one of the left and right upper rear frame members 190, 192 and the left and right upper rear suspension sub-frame members 210, 212. Left and right rear connecting frame members 230, 232 are disposed bridgingly between and mounted to the respective left and right lower rear suspension sub-frame members 216, 218 and the rearmost cross member 226. Upper and lower support brackets for rear suspension assemblies are mounted to the respective left and right upper and lower rear suspension sub-frame members.

A component mounting bracket 240 for an operational component of the vehicle (e.g., a battery generator/charger) is mounted to the forward end portion 130, 132 of each left and right upper main frame member 120, 122 forward of the forward support member 140. In the depicted embodiment, the component mounting bracket 240 includes a vertically extended support wall 242 having an upper end portion 244 which can be folded to at least partially overlie the upper mounting surfaces 124, 126 of the left and right upper main frame members 120, 122. A horizontally extended support wall 246 extends forward from a lower end portion 248 of the support wall 242.

The exemplary frame structure 102 further includes left and right upper forward suspension sub-frame members 250, 252 mounted to the forward portions 154, 156 of the respective left and right lower main frame members 150, 152. The support wall 246 of the component mounting bracket 240 can mounted to the left and right upper forward suspension sub-frame members 250, 252. Left and right lower forward suspension sub-frame members 256, 258 are disposed bridgingly between and mounted to downward curved forward end portions 260, 262 of the respective left and right upper forward suspension sub-frame members 250, 252 and the forward portions 154, 156 of the respective left and right lower main frame members 150, 152. Upper and lower support brackets for forward suspension assemblies are mounted to the respective left and right upper and lower forward suspension sub-frame members. Left and right second sub-frame members 270, 272 are disposed bridgingly between and mounted to the forward end portions 130, 132 of the respective left and right upper main frame members 120, 122 and the respective left and right upper forward suspension sub-frame members 250, 252. The support wall 242 of the component mounting bracket 240 is located forward of the left and right second sub-frame members 270, 272.

Figure 9:
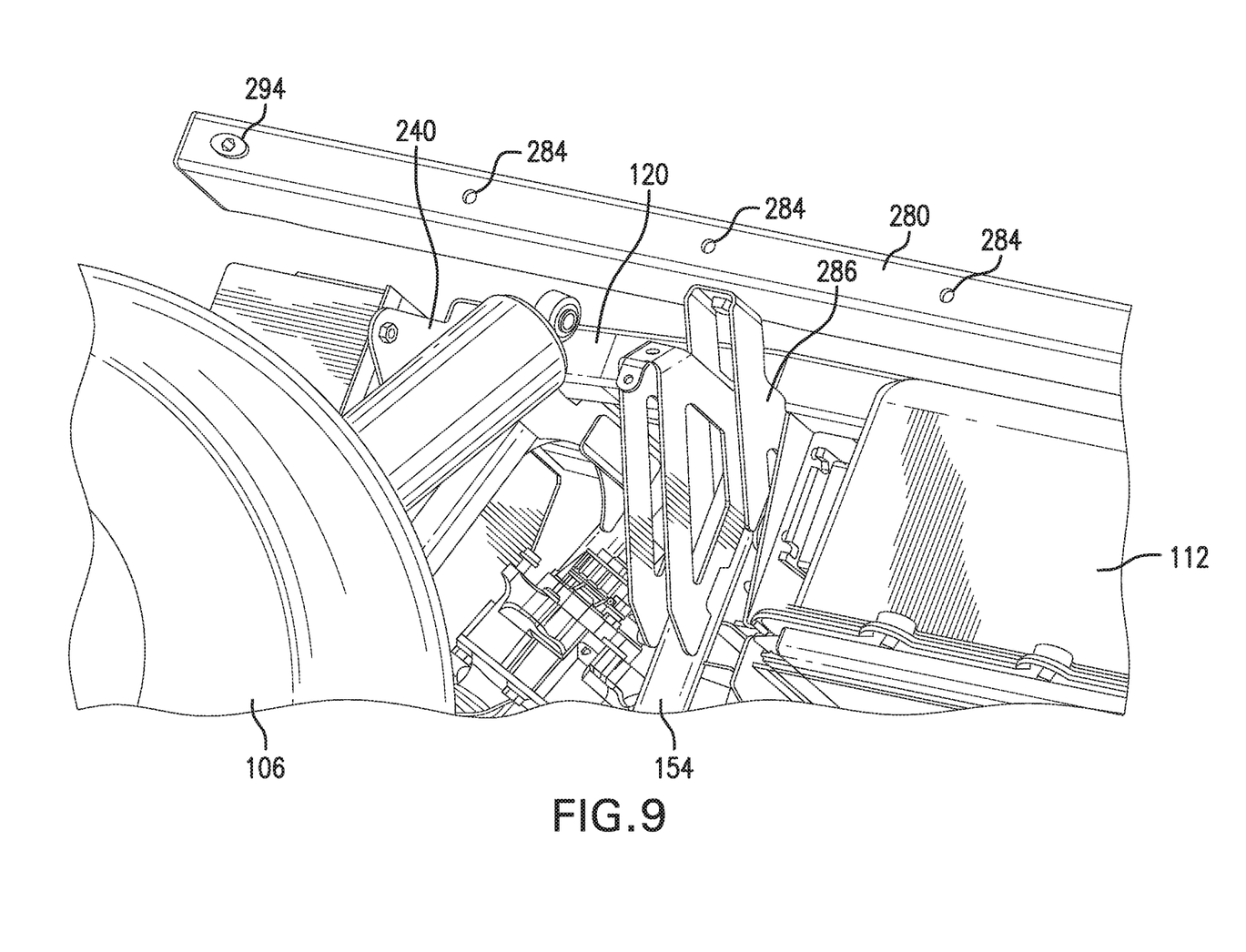
FIG. 9 is a partially enlarged view of FIG. 1.

As depicted in FIGS. 1 and 9, mounted to the frame structure 102 are left and right frame rails 280, 282 which are extended in the longitudinal direction of the frame structure 102. Each of the left and right frame rails 280, 282 can be provided with an array of apertures (only apertures 284 in the left frame rail are shown) for releasably attaching quick detach pins 294 for mounting of associated vehicle accessories to the frame structure 102. The horizontally disposed cargo carrying platform 116 is mounted to the left and right frame rails 280, 282 above the left and right upper main frame members 120, 122, and a width of the cargo carrying platform 116 is greater than a spacing between the left and right frame rails 280, 282. For example, upper surfaces of the left and right frame rails 280, 282 can be provided with an array of mounting apertures which allow for the releasable attachment of the cargo carrying platform 116. As shown in FIGS. 2-5, in the depicted embodiment, left and right forward platform mounting brackets 286, 288 and left and right rear platform mounting brackets 290, 292 are mounted to the frame structure 102, particularly one of the respective left and right upper main frame members 120, 122 and the respective left and right lower main frame members 150, 152. By way of example, the left and right forward platform mounting brackets 286, 288 can be mounted to the forward portions 154, 156 of the respective left and right lower main frame members 150, 152. And the left and right rear platform mounting brackets 290, 292 can be mounted to the rearward portions 158, 160 of the respective left and right lower main frame members 150, 152. The left frame rail 280 is mounted to mounting surfaces of the left forward and rear platform mounting brackets 286, 290, and the right frame rail 282 is mounted to mounting surfaces of the right forward and rear platform mounting brackets 288, 292. According to one aspect, the mounting surfaces of the respective left and right forward mounting brackets 286, 288 and the left and right rear platform mounting brackets 290, 292 are parallel to (and, for example, coplanar with) the upper mounting surfaces 124, 126 of the respective left and right upper main frame members 120, 122. The left and right frame rails 280, 282 are offset in a height direction of the frame structure 102 from the left and right upper main frame members 120, 122. Accordingly, the upper surfaces 124, 126 of the left and right upper main frame members 120, 122 together define an uppermost mounting plane of the frame structure 102, and the operational components for driving and maneuvering the vehicle 100 which are mounted to the frame structure 102 are disposed entirely beneath the uppermost mounting plane of the frame structure 102.

Figure 6:
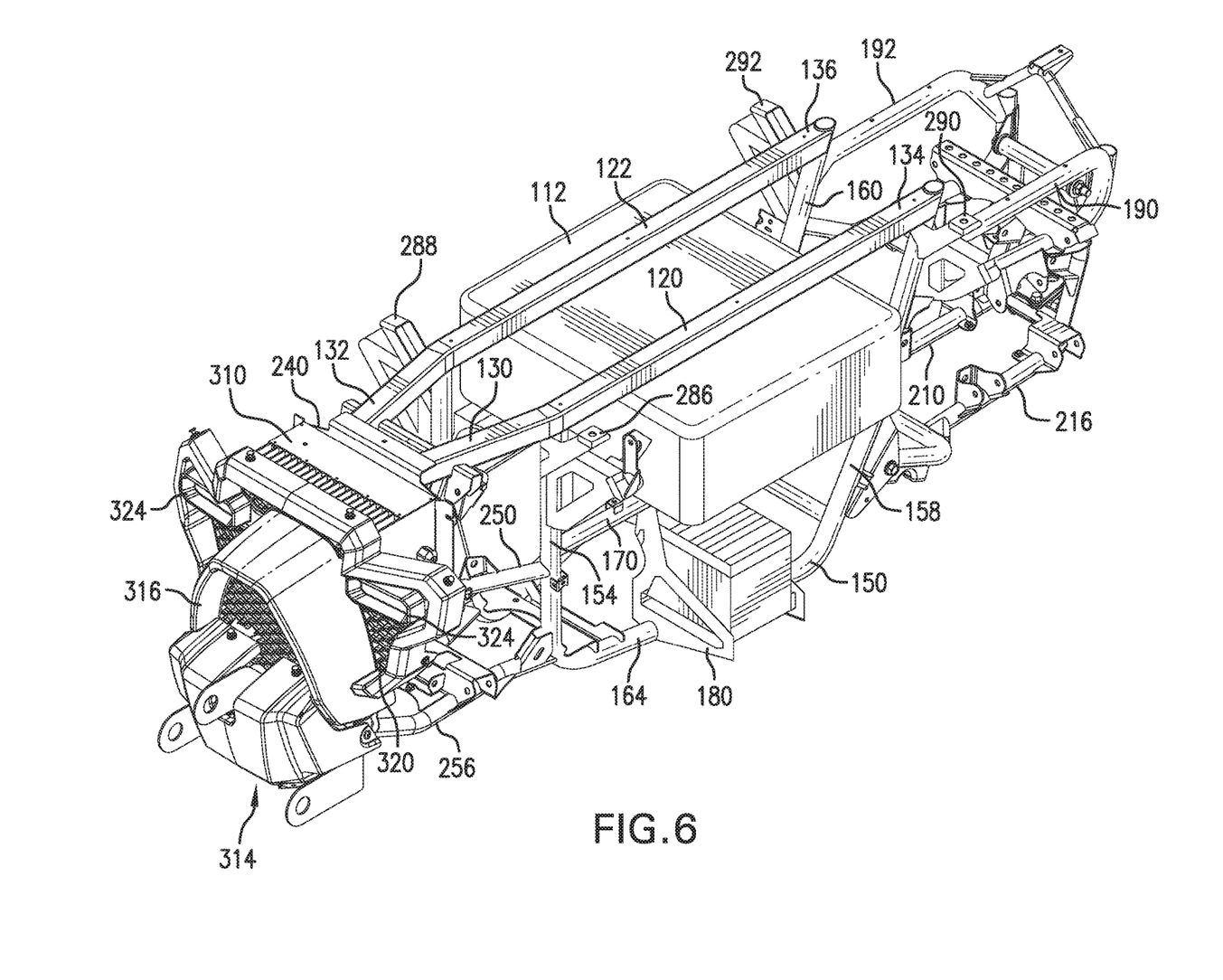
FIGS. 6 and 7 are perspective views of the frame structure with operational components for driving and maneuvering the vehicle mounted thereto.
Figure 7:
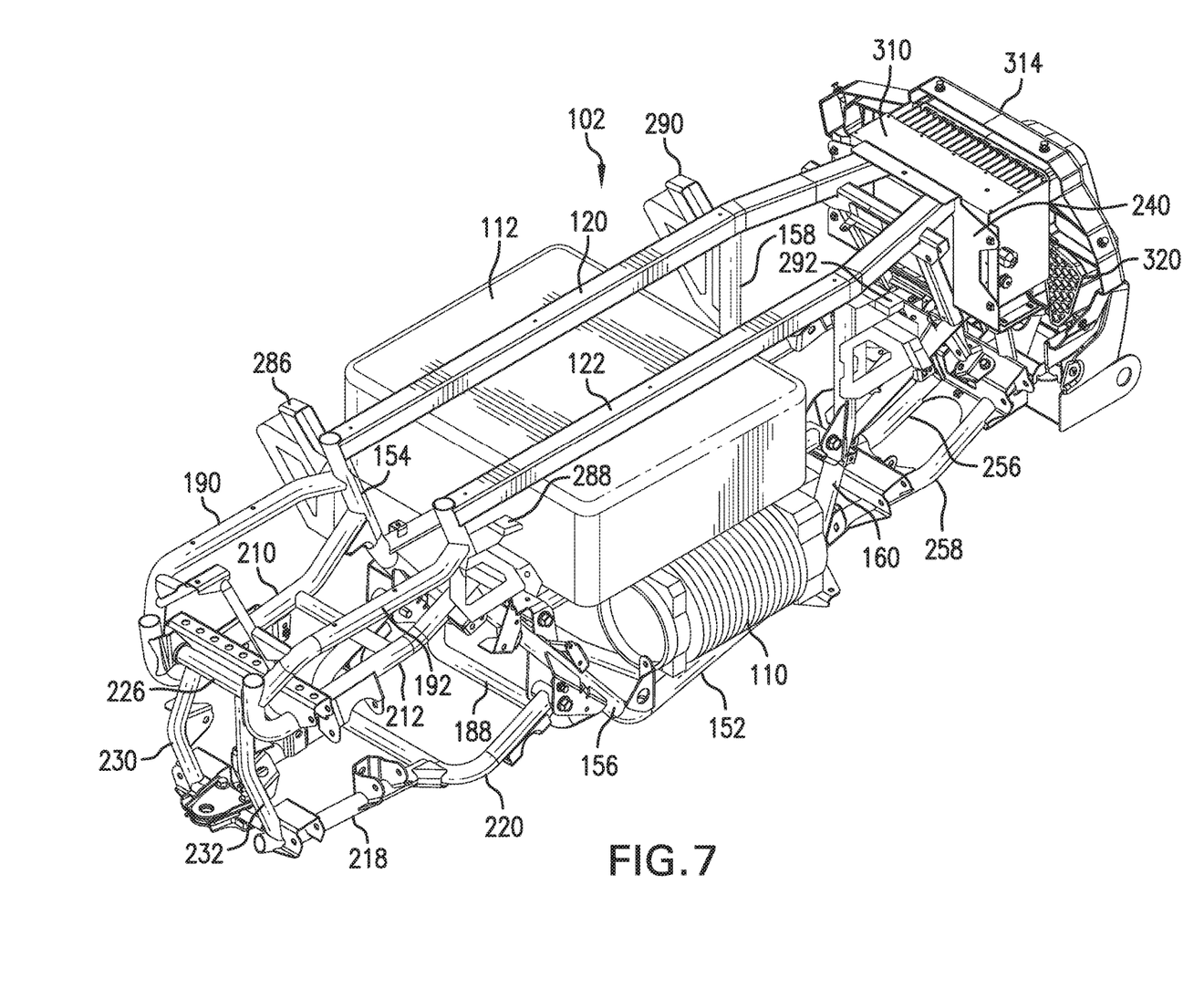
Figure 8:
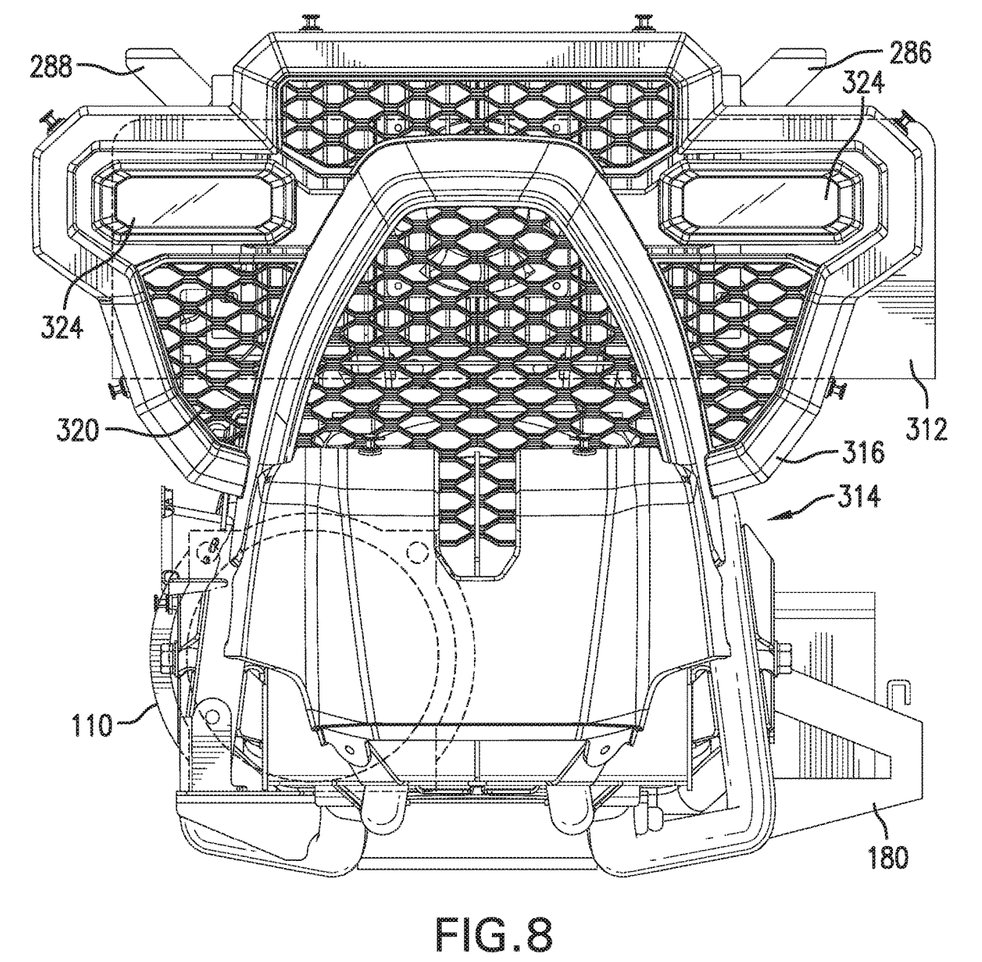
FIG. 8 is a front view of the frame structure of FIG. 6.

FIGS. 6-8 depict the electric motor 110 and the battery pack 112 mounted to the frame structure 102 beneath the uppermost mounting plane of the frame structure 102. Further depicted is a housing 310 mounted to the component mounting bracket 240 for enclosing a battery generator/charger, which locates the housing 310 forward of the forward end portions 130, 132 of the respective left and right upper main frame members 120, 122. According to one aspect, the housing 310 is provided in a space between the component mounting bracket 240 and a front grille 314 of the vehicle 100. As shown, the front grille 314 includes a frame 316 surrounding a securing a screen 320, and openings 324 for associated operating lights are located on the front grille 314.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A frame structure for an autonomous all-terrain vehicle comprising:

left and right laterally spaced upper main frame members extended in a longitudinal direction of the frame structure, each of the left and right upper main frame members is horizontally disposed and has an upper mounting surface, and each of the left and right upper main frame members includes a forward end portion and a rearward end portion and extends continuously and without interruption between the forward and rearward end portions;

left and right laterally spaced lower main frame members extended in the longitudinal direction, each of the left and right lower main frame members having a forward portion and a rearward portion each inclined upwards and mounted to the respective left and right upper main frame members and a central portion extended in a lateral direction of the frame structure outward of the respective left and right upper main frame members in a top view of the frame structure;

left and right first sub-frame members extended in the longitudinal direction, the left and right first sub-frame members are located between the respective left and right upper main frame members and the respective left and right lower main frame members in a height direction of the frame structure, the left and right first sub-frame members are disposed bridgingly between and mounted to the forward and rearward portions of the respective left and right lower main frame members, and the left and right first sub-frame members are laterally aligned with the respective left and right upper main frame members in the top view of the frame structure; and left and right frame rails extended in the longitudinal direction of the frame structure, the left and right frame rails are laterally offset in the lateral direction of the frame structure from the respective left and right upper frame members and the respective left and right first sub-frame members in the top view of the frame structure, and the left and right frame rails are offset higher in a height direction of the frame structure from the left and right upper main frame members.

2. The frame structure of claim 1, wherein the left and right first sub-frame members separate a component space defined by the frame structure into an upper component space for mounting of an associated first operational component and a lower component space for mounting of an associated second operational component.

3. The frame structure according to claim 1, wherein each of the left and right upper frame members is rectangular shaped in cross-section taken along the lateral direction of the frame structure.

4. The frame structure of claim 1, including left and right laterally spaced upper rear frame members extended in the longitudinal direction rearward of the left and right main frame members, each of the left and right upper rear frame members is horizontally disposed, offset in a downward direction from the respective left and right upper main frame members in the height direction, and mounted to the respective rearward inclined portions of the left and right lower main frame members.

5. The frame structure of claim 4, wherein a rear end portion of each of the left and right upper rear frame members is curved downwardly, and further including left and right upper rear suspension sub-frame members disposed bridgingly between and mounted to the rearward inclined portions of the respective left and right lower main frame members and the rear end portions of the respective left and right upper rear frame members.

6. The frame structure according to claim 1, including a component mounting bracket mounted to a forward end portion of each of the left and right upper main frame members.

7. The frame structure according to claim 6, including left and right upper forward suspension sub-frame members mounted to the forward inclined portions of the respective left and right lower main frame members, the component mounting bracket mounted to each of the left and right upper forward suspension sub-frame members.

8. The frame structure according to claim 7, including left and right second sub-frame members disposed bridgingly between and mounted to the forward end portions of the respective left and right upper main frame members and the respective left and right upper forward suspension sub-frame members, wherein the component mounting bracket is forward of the left and right second sub-frame members.

9. The frame structure according to claim 1, including a horizontally disposed cargo carrying platform mounted to the left and right frame rails, a width of the cargo carrying platform greater than a lateral spacing between the left and right frame rails.

10. The frame structure according to claim 9, including left and right forward platform mounting brackets mounted to the forward inclined portions of the respective left and right lower main frame members.

11. The frame structure according to claim 9, including left and right rear platform mounting brackets mounted to the rearward inclined portions of the respective left and right lower main frame members.

12. An autonomous all-terrain vehicle comprising:
a frame structure including left and right upper main frame members laterally spaced in a lateral direction of the frame structure and extended in a longitudinal direction of the frame structure, each of the left and right upper main frame members is horizontally disposed, wherein each of the left and right upper main frame members includes a forward end portion and a rearward end portion and extends continuously and without interruption between the forward and rearward end portions, and wherein upper surfaces of each of the left and right upper main frame members together define an uppermost mounting plane of the frame structure;
left and right laterally spaced lower main frame members extended in the longitudinal direction, each of the left and right lower main frame members having a forward portion and a rearward portion each inclined upwards and mounted to the respective left and right upper main frame members, and
the vehicle further includes:
left and right forward platform mounting brackets mounted to the forward inclined portions of the respective left and right lower main frame members,
left and right rear platform mounting brackets mounted to the rearward inclined portions of the respective left and right lower main frame members, left and right frame rails mounted to the frame structure and extended in the longitudinal direction, wherein the left frame rail is mounted to the left forward and rear platform mounting brackets and is offset higher in a height direction of the frame structure from the left upper main frame member, and the right frame rail is mounted to the right forward and rear platform mounting brackets and is offset higher in the height direction of the frame structure from the right upper main frame member, and
operational components for driving and maneuvering the vehicle mounted to the frame structure, wherein each of the operational components is disposed entirely beneath the uppermost mounting plane of the frame structure, and the left and right upper frame members span in the longitudinal direction over the operational components.

13. The vehicle according to claim 12, wherein the left and right frame rails span in the longitudinal direction over the operational components, and a horizontally disposed cargo carrying platform mounted to the left and right frame rails.

14. The vehicle according to claim 12, wherein a forward end portion of each of the left and right upper main frame members is extended forward of the forward portions of the respective left and right lower main frame members, and a rear end portion of each of the left and right upper main frame members terminating at the rearward portions of the respective left and right lower main frame members.

15. The vehicle according to claim 12, wherein the frame structure includes left and right first sub-frame members disposed bridgingly between and mounted to the forward and rearward portions of the respective left and right lower main frame members, the left and right first sub-frame members are laterally aligned with the respective left and right upper main frame members in a top view of the frame structure.

* * * * *